United States Patent [19]

Goldstein et al.

[11] Patent Number: 4,551,724

[45] Date of Patent: Nov. 5, 1985

[54] METHOD AND APPARATUS FOR CONTOUR MAPPING USING SYNTHETIC APERTURE RADAR

[75] Inventors: Richard M. Goldstein, La Canada; Edward R. Caro, Monterey Park; Chialin Wu, Pasadena, all of Calif.

[73] Assignee: The United States of America as represented by the Administrator of the National Aeronautics and Space Administration, Washington, D.C.

[21] Appl. No.: 465,365

[22] Filed: Feb. 10, 1983

[51] Int. Cl.[4] ............................................. G01S 13/90
[52] U.S. Cl. ............................. 343/5 CM; 343/5 CD; 343/5 VQ; 367/88
[58] Field of Search ............. 343/5 CM, 5 VQ, 5 CD; 367/88

[56] References Cited

U.S. PATENT DOCUMENTS

| | | | |
|---|---|---|---|
| 2,616,077 | 10/1957 | Holser | 343/5 CM |
| 3,144,631 | 8/1964 | Lustig et al. | 343/5 CM |
| 3,160,696 | 12/1964 | Hideya Gamo | 356/345 |
| 3,191,170 | 6/1965 | Lustig et al. | 343/5 R |
| 3,202,992 | 8/1965 | Kent et al. | 343/372 |
| 3,603,992 | 9/1971 | Goggins, Jr. et al. | 343/5 CM |
| 3,680,124 | 7/1972 | Stone et al. | 343/424 |
| 3,681,747 | 8/1972 | Walsh | 343/5 CM |
| 3,691,557 | 9/1972 | Constant | 343/6.5 |
| 3,727,219 | 4/1973 | Graham | 343/5 CM |
| 3,735,399 | 5/1973 | Sletten et al. | 343/7.7 |
| 3,735,400 | 5/1973 | Sletten et al. | 343/7.7 |
| 3,740,002 | 6/1973 | Schaefer | 244/3.19 |
| 3,741,653 | 6/1973 | Svetlinchny | 356/141 |
| 3,790,939 | 2/1974 | Constant | 343/10 |
| 3,843,261 | 10/1974 | Pryor | 356/111 |
| 3,899,253 | 8/1975 | Overhoff | 356/108 |
| 4,159,522 | 6/1979 | Zanoni | 364/515 |
| 4,204,210 | 5/1980 | Hose | 343/6 R |
| 4,309,109 | 1/1982 | Blodgett et al. | 356/355 |
| 4,316,670 | 2/1982 | Corwin et al. | 356/349 |
| 4,321,601 | 3/1982 | Richman | 343/5 CM |
| 4,359,732 | 11/1982 | Martin | 343/5 CM |

OTHER PUBLICATIONS

"Two Frequency Radar Interferometry Applied to the Measurement of Ocean Wave Height," IEEE Transactons on Antennas and Propagation, vol. AP-21, No. 5, Sep. 1973, pp. 649–656.

*Primary Examiner*—T. H. Tubbesing
*Assistant Examiner*—K. R. Kaiser
*Attorney, Agent, or Firm*—Paul F. McCaul; John R. Manning; Thomas H. Jones

[57] ABSTRACT

By using two SAR antennas spaced a known distance, B, and oriented at substantially the same look angle to illuminate the same target area, pixel data from the two antennas may be compared in phase to determine a difference $\Delta\phi$ from which a slant angle $\theta$ is determined for each pixel point from an equation $\Delta\phi = (2\pi B/\lambda)\sin(\theta-\alpha)$, where $\lambda$ is the radar wavelength and $\alpha$ is the roll angle of the aircraft. The height, h, of each pixel point from the aircraft is determined from the equation $h = R \cos\theta$, and from the known altitude, a, of the aircraft above sea level, the altitude (elevation), a', of each point is determined from the difference $a-h$. This elevation data may be displayed with the SAR image by, for example, quantizing the elevation at increments of 100 feet starting at sea level, and color coding pixels of the same quantized elevation. The distance, d, of each pixel from the ground track of the aircraft used for the display may be determined more accurately from the equation $d = R \sin\theta$.

10 Claims, 4 Drawing Figures

METHOD AND APPARATUS FOR CONTOUR MAPPING USING SYNTHETIC APERTURE RADAR

ORIGIN OF INVENTION

The invention described herein was made in the performance of work under a NASA contract and is subject to the provisions of Section 305 of the National Aeronautics and Space Act of 1958, Public Law 85-586 (72 Stat. 435; 42 USC 2457).

BACKGROUND OF THE INVENTION

This invention relates to synthetic aperture radar (SAR), and more particularly to a method and apparatus for determining the elevation of terrain features in SAR image data, and if desired for determining more accurately the distance of each pixel from the ground track of the SAR platform.

The development of SAR has made it possible to quickly map vast areas for geological as well as for defense purposes. Since topographic maps are much more useful, it would be important to use SAR for contour mapping. However, in mapping rough terrain, there is a problem in that terrain features of high altitude tend to be foreshortened (i.e., appear to be closer to the ground track of the SAR platform than they actually are), and the greater the slope of the terrain feature, the more pronounced the foreshortening effect. This is due to the fact that the range of each image pixel from the flight path is essentially determined by the slant range of the SAR platform to the reflecting points on the terrain.

It would be desirable to determine the altitude of each point on the slope, and to determine the true horizontal distance of each point from the ground flight path, in order to present an image that accurately portrays the contours in rough terrain without foreshortening.

SUMMARY OF THE INVENTION

In accordance with the present invention, two SAR antennas are spaced apart a distance, B, on a platform which carries the SAR over terrain at a known altitude, a, with respect to a fixed reference, such as sea level. The return signals from each point to the antennas are separately processed to the pixel level, and the phase differences in the signals returned through the two antennae from substantially the same points are detected. The phase difference, $\Delta\phi$, detected for each point is related to the spacing B between the antennas by the following equations:

$$\Delta\phi = \frac{2\pi B}{\lambda} \sin(\theta - \alpha)$$

where $\theta$ is the angle between the slant range line and a vertical line, $\alpha$ is the roll angle of the SAR platform and $\lambda$ is the radar wavelength. The height of the SAR platform above each point is related to the slant range by the equation $$h = R \cos\theta$$

Thus, from the measured phase difference, $\Delta\phi$, the slant angle $\theta$ is determined for each pixel from the first equation. Then the height, h, of the platform is determined from the second equation. Since the altitude, a, of the SAR platform is known from an independent instrument measurement, the altitude, a', of each pixel (point) is determined directly from the equation $$a' = a - h.$$

For more accurate position display of the pixels, the distance, d, of each point is determined from the equation $$d = R \sin\theta$$

Each more accurate pixel may then be properly displayed in distance from the ground track of the flight path with its altitude indicated. Contour lines may be displayed by connecting points of equal altitude a' at regular quantized increments of altitude (elevation), or by simply color coding pixels at regular quantized increments of elevation.

DESCRIPTION OF PREFERRED EMBODIMENTS

Figure 1:
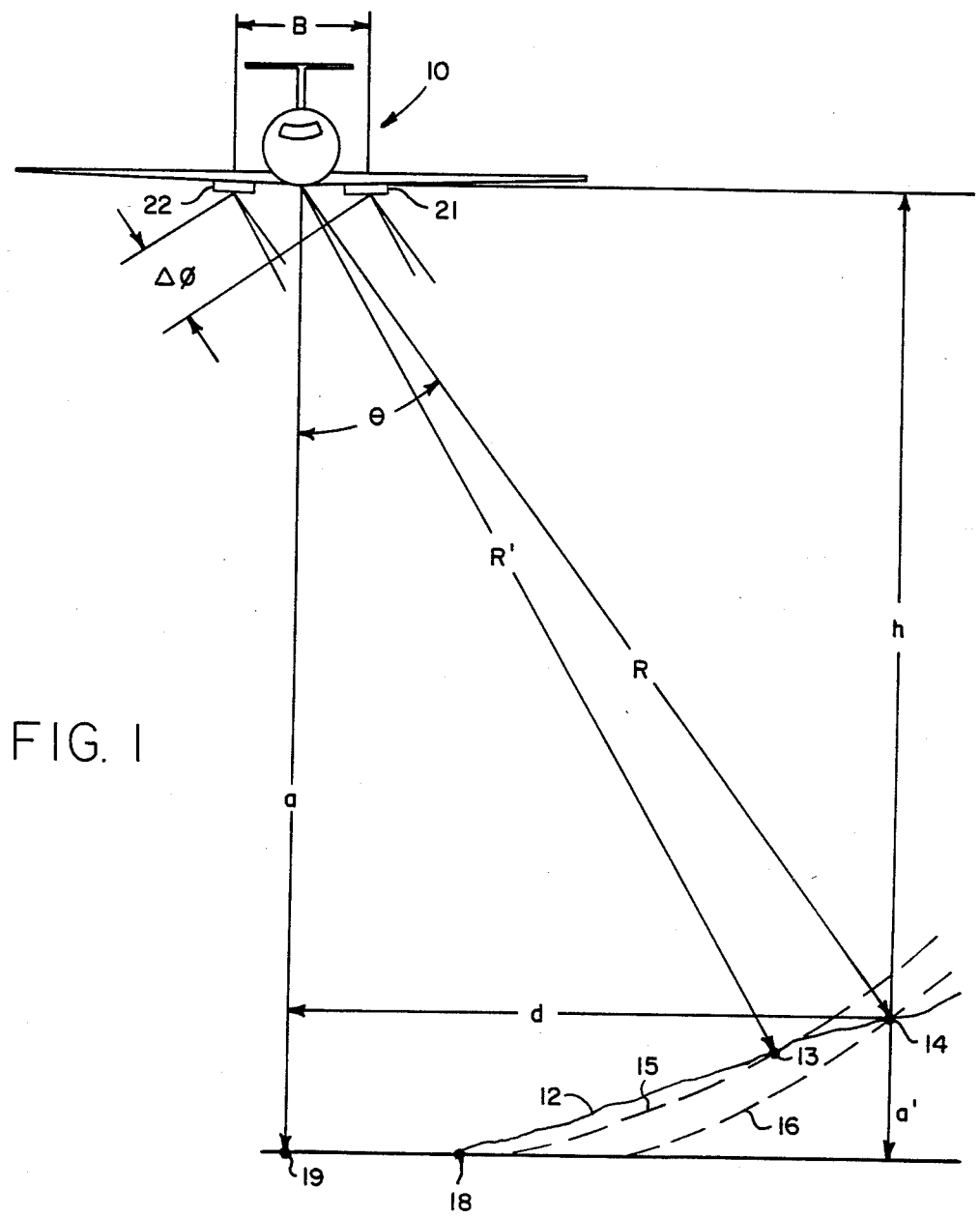
FIG. 1 is a diagram useful in understanding the nature of the problem which the present invention presents.

Referring now to the drawings, FIG. 1 shows the geometry involved in the foreshortening effect of a SAR system carried by an aircraft 10 over rough terrain 12 illustrated as a slope rising from sea level, or some other known reference level. Doppler processing localizes a given pixel to the plane of the figure, and range processing localizes each pixel to an arc, such as pixels at points 13 and 14 part of the way up the slope which are localized to arc 15 and 16.

It is clear that the point 14 has a slant range, R, greater than the slant range R' of point 13. Since the slant range R for the point 14 is only slightly greater than at the point 13, it will be displayed at a distance from the ground track of the aircraft less than the actual distance d from the ground track, but greater than the distance of point 13. This foreshortening effect may be corrected as a consequence of the present invention by which the height, h, of the SAR above the point 14 is determined, and from its height and slant range, both the altitude a' and the distance d of the point 14 from the ground track are determined. The pixel from point 14 can be displayed with its true altitude a' at the proper distance from the ground track.

The object of the invention is to determine the altitude a' of each point. As just noted, it is necessary to first determine the height, h, of the aircraft above the point, and from the known altitude of the aircraft determine altitude a' as the difference between a and h. This is a geometric problem that can be solved with a programmed SAR data processor once the slant angle $\theta$ of the line of sight from the aircraft to the point is determined. Note that this angle is distinct from the "look angle," which is the angle that the bore axis of the side-looking SAR is depressed below a plane passing through the wings of the aircraft. The look angle is fixed, but the slant angle of signal return from a given point at a particular range is a function of the height of the aircraft with respect to that given point. Consequently, the problem is to determine the slant angle $\theta$ for each point from which the height, h, and the distance, d, of that point can be determined for displaying each pixel in its proper position with respect to the ground track of the aircraft, and to plot or otherwise indicate its altitude.

To determine the slant angle $\theta$, a planar array antenna 21 is connected to a standard SAR transmitter and receiver, and a second planar array antenna 22 spaced a distance B from the first is connected to the same transmitter and either to the same receiver through a multiplexer, or preferably to a separate receiver.

The principle involved is to illuminate the target area with radar pulses and receive echoes through the two antennae fixed on the aircraft at substantially the same look angle. The arrival time at the antennas of the echoes from a reflecting point would be slightly different because of the spacing, B, between the antennas such that the range to each reflecting point is slightly different. By maintaining that phase information through the whole receiving and recording process, the elevation a' of each pixel in the radar image can be computed.

Figure 2:
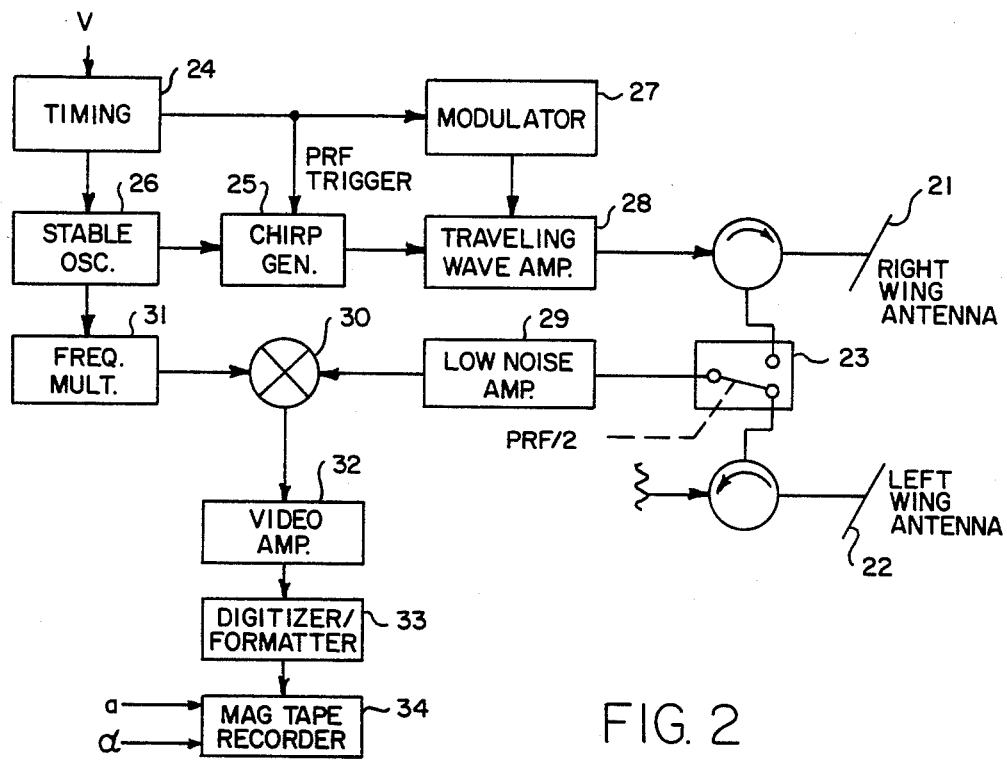
FIG. 2 is a block diagram of an exemplary implementation of a SAR for the present invention.

In an exemplary implementation shown in FIG. 2, antennae 21 and 22 are multiplexed by an antenna selector switch 23 and coupling circulators 23a and 23b to sample the echo signal first from one antenna and then the other every other transmitted pulse. The pulse repetition frequency ranges from 800 to 1000 pps depending on aircraft ground speed which is sufficiently high for echo returns from successive transmitted pulses to be from substantially the same points. A timing unit 24 receives a ground speed signal, V, from aircraft instrumentation to control the frequency of a timing oscillator which controls the generation of PRF trigger pulses to enable a chirp generator 25 to transmit a burst of cycles from the stable oscillator 26 the phase of which is controlled by the timing unit 24. A modulator 27 is controlled by PRF trigger pulses to provide in a traveling wave amplifier 28 linear frequency modulation of the signal from the oscillator 26 gated by the chirp generator 25. This FM modulation (chirp) allows for a matched filter in the data processor (FIG. 3) to produce a compressed pulse from the chirp for better range resolution in a customary manner. The PRF rate is slaved to the aircraft ground speed so that the target is illuminated with a substantially constant number of pulses per kilometer.

The received echoes are passed through a receiver amplifier 29, and a mixer 30 which receives an appropriate frequency from the phase controlled oscillator 26 via a frequency multiplier 31. The received echoes are downconverted to video in the mixer, amplified in a video amplifier 32 and digitized in vector form (real and imaginary components) in an analog-to-digital converter and formatter 33. The analog echoes thus converted to digital vectors are then stored in a high density magnetic tape recorder 34 as two records for later processing.

Figure 3:
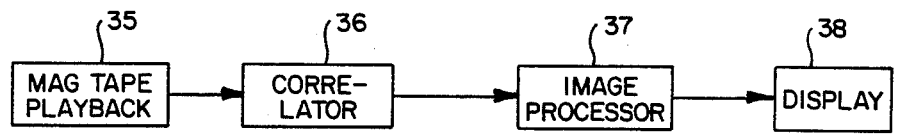
FIG. 3 is a block diagram of an off-line system for processing image data in accordance with the present invention.

At the end of the data run, the tape is removed and interfaced with a playback unit 35 having a digital correlator 36, as shown in FIG. 3. The correlator performs a two dimensional compression which then allows extraction from the vectors in digital form not only of phase, but also of the intensity of each picture element in the two records. These intensity values are then assembled by an image processor 37, into an image for each record. By consuming the images in a display unit 38, it is possible to determine whether or not the two records are registered. If so, the two images reinforce each other for a clear and brighter image, if not, the result is loss of the image, and one of the records must be adjusted relative to the other until a clear and brighter image appears, i.e., until there is registration between the records on a pixel by pixel basis.

Once registration is achieved, corresponding vectors of the pixels are compared by the image processor to determine the phase difference, $\Delta\phi$, between the antennae. The differential phase thus determined for each pixel is indicative of the height, h, of the aircraft above the pixel. Then the image processor determines for each pixel the altitude (elevation), a', and distance, d, of the reflecting point and encodes the pixel in accordance with both the distance, d, and the altitude, a', for display through the display unit 38 with every pixel at its proper distance and with altitude indicated, as by color coding the intensity display of points after quantizing their altitude at increments of 100 feet.

Figure 4:
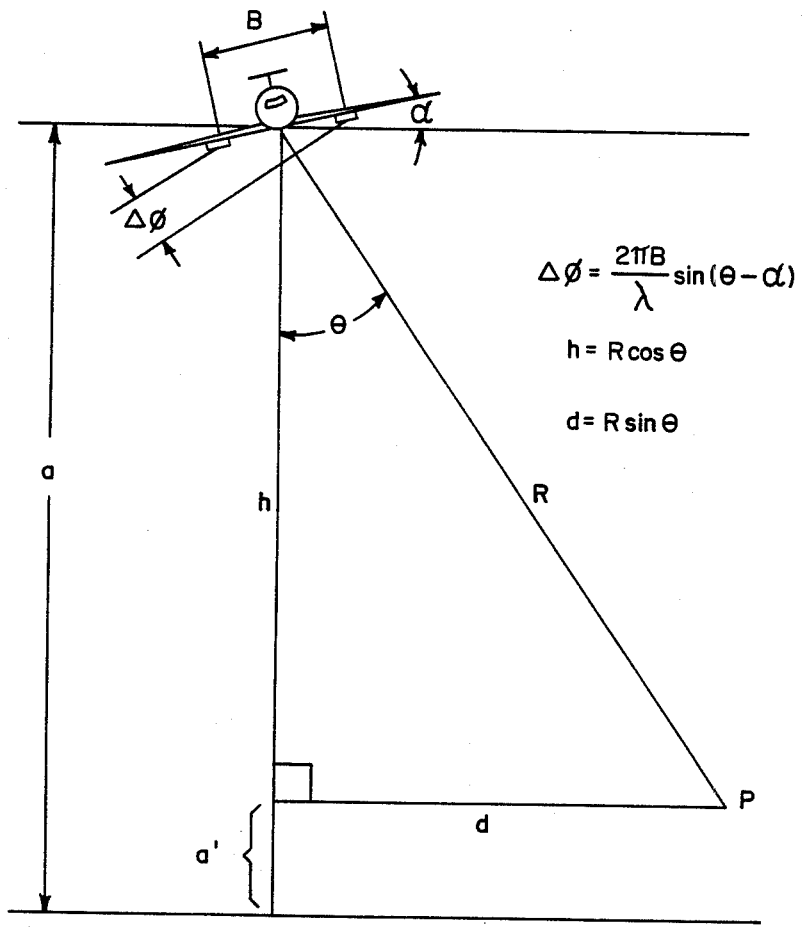
FIG. 4 is a geometric diagram useful in understanding the technique of the present invention, which is a method for determining true range (or distance from the ground track of the SAR flight path) and altitude of each pixel.

From the foregoing, it is evident that the systems shown in FIG. 2 is composed mainly of standard radar circuit components. The features that are different from prior art imaging radar are the use of two spaced planar array antennas mounted so that they can receive echoes simultaneously, or substantially so, from the same target area. The antennas are mounted at a known fixed separation, B, on the aircraft for altitude (elevation) computation by the image processor in the following manner. From the phase difference, $\Delta\phi$, determined by comparing the vectors of the two echoes received through the two antennae, the slant angle $\theta$ is computed from the following equation:

$$\Delta\phi = \frac{2\pi B}{\lambda} \sin(\theta - \alpha) \tag{1}$$

where $\lambda$ is the radar wavelength and $\alpha$ is the roll angle of the aircraft, as shown in FIG. 4. From that, the height of the aircraft above the reflecting point is computed from the equation:

$$h = R \cos\theta \tag{2}$$

And from the known altitude, a, of the aircraft, the altitude (elevation), a', of the point is computed from the equation:

$$a' = a - h \tag{3}$$

The distance d of the point from the ground track of the aircraft may be computed also from the following equation:

$$d = R \sin\theta \tag{4}$$

This information (a' and d) is stored with the intensity value for each pixel. The value d may be used in plotting or otherwise displaying each element of the image through the display unit 38.

In displaying the SAR image data, elevation may be quantized at intervals of 100 feet and displayed in different colors in order to provide one type of contour map, as noted hereinbefore. To produce an image with more conventional contour lines, it would be possible to display all elements at their proper distance and then superimpose lines connecting adjacent elements of the same quantized elements at intervals of 100 feet starting with the lowest elevation. Another way to display elevation information for quantized elements would be to print the quantized elevation at the center of every predetermined number of adjacent elements of the same quantized elevation. Still other ways of displaying elevation data will occur to those skilled in the art once the values d and a' are computed in accordance with the present invention for each element (pixel) by the image processor for display. In that manner, a contour map of vast areas may be produced in a relatively easy and quick manner with an accuracy which largely depends on the spacing, B, between the antennae. The greater the spacing, the greater the accuracy.

FIG. 4 illustrates the problem in geometry which the image processor 37 computes for each pair of received echoes after having their phase difference $\Delta\phi$ and slant range R computed by the correlator 36. The roll angle, $\alpha$, taken into account in Equation (1) is exaggerated for emphasis in FIG. 4. In practice, that angle will be very small, but since it is a parameter continuously monitored by the aircraft flight instruments, it is recorded with the SAR data, along with aircraft altitude so that roll angle may be taken into account for greater accuracy.

From Equation (1), the slant angle $\theta$ is computed. Then using the slant range, R, the height, h, of the aircraft from the point P is computed from Equation (2). The altitude (elevation) a' of the point P is then computed as the difference a−h, as indicated by Equation (3). This provides elevation data for imaging, but to improve the accuracy of the contour image that can be produced from that image data, the correct distance, d, of each element is computed from Equation (4) for use in generating the image display. All of these equations are relatively easy to compute in an image processor comprised of a programmed digital computer. A simple technique would be to use a table for each equation.

In an actual reduction to practice, the phased array antennae were placed symmetrically about the fuselage on the underside of the wing of a Convair CV-990 aircraft. The antennae were spaced 11.17 meters apart with the boresight of the antenna 21 on the right side (looking at the aircraft from the front at 24.5° from the vertical and the boresight of the antenna 22 on the left side 24° from vertical. The 0.5° boresight offset between the antennae minimizes the possibility of sidelobe interference signals between the two antennae without degrading the accuracy of the system for aircraft altitudes of more than about 2,000 and 3,000 feet above the terrain.

Approximately twenty seconds of imaging data obtained over the Monterey Peninsula were processed into two images in complex format, one image for the data from each antenna. Then the pixel altitude a' was computed for each element and displayed in a color code in a manner described hereinbefore, starting with the lowest quantized altitude. (Image brightness for each pixel correspond to received echo power.) Blue was used for sea level, and increasing altitudes were shown in green, yellow, orange, magenta, purple and violet. The full band was thus equal to about 500 feet of elevation difference. The colors were then repeated. The color contours generally followed the local contours with excellent agreement, even without computing the distance d to correct the position of each pixel. Altitude variations of 50 feet are thus easily discerned. Sensitivity was greatest in the near range.

Although preferred embodiments of the invention have been described and illustrated herein, it is recognized that modifications, improvements and equivalents may readily occur to those skilled in this art. For example, since several echoes are returned in succession from essentially the same point, pixels from the two records may be combined for the same point to achieve the best estimate of $\Delta\phi$, and this best estimate may be corrected for slight variations in $\Delta\phi$ at greater distances from the ground track. Such improvements would add to the complexity of the image processor, but would not depart from the present invention. Consequently, it is intended that the claims be interpreted to include such modifications, improvements and equivalents as within the broader scope of the present invention.

What is claimed is:

1. A method for determining the elevation of terrain features in synthetic aperture radar image data using two antennae spaced apart a fixed distance, B, on a platform which carries the radar over terrain at a known altitude, a, with respect to a fixed reference, where the distance B is measured in a horizontal plane while the platform is in level flight, comprising the steps of separately processing the return signals from said antennae to the pixel level and determining the slant range, R, and phase difference, $\Delta\phi$, of pixels from the return signals received through said two antennae from substantially the same point of said terrain, from said phase difference, $\Delta\phi$, and said spacing, B, determining for each pixel the slant angle, $\theta$, between the slant range and a vertical line from the radar platform to the terrain, determining the vertical height, h, of said platform above each pixel from the slant range R as a function of the cosine of the slant angle $\phi$ for each pixel, and for each pixel, determining elevation, a', above said fixed reference as the difference between said known altitude a of the radar platform and the determined height h of said platform with respect to a corresponding point on said terrain for each pixel.

2. A method as defined in claim 1 including the process of displaying said pixels with an indication of elevation.

3. A method as defined in claim 2 including the step of determining the horizontal distance, d, of each point on said terrain for each pixel from said vertical line and displaying each pixel at its distance from said vertical line.

4. A method as defined in claim 1 wherein said indication of elevation is displayed by quantizing elevation of pixels at predetermined constant intervals, and for pixels of equal quantized elevation, displaying intensity in a predetermined color distinct from all other colors used for other quantized elevations over at least a distinct band of quantized elevations.

5. A method as defined in claim 4 including the step of determining the horizontal distance, d, of each point on said terrain for each pixel from said vertical line and displaying each pixel at its distance from said vertical line.

6. A method for determining the elevation of terrain features in synthetic aperture radar image data using two antennae spaced apart a fixed distance, B, on a platform which carries the radar over terrain, where the distance B is measured in a horizontal plane while the platform is in level flight, comprising the step of separately processing the return signals from said antennae in complex vector form to the pixel level, and recording for each pixel from each antennae the altitude, a, of the radar platform above a fixed reference together with the roll angle, $\alpha$, of the platform, determining the slant range, R, of pixels from the return signals received through said two antennae from substantially the same point of said terrain, from said pixel data in complex vector form, determining the phase difference, $\Delta\phi$, between pixels received from substantially the same point through said separate antennae from the relationship expressed by the equation $\Delta\phi = (2\pi B/\lambda) \sin(\theta - \alpha)$ where $\lambda$ is the wavelength of said radar, determining the vertical height, h, of said platform above each pixel from the slant range as a function of the cosine of the slant angle R for each pixel, and for each pixel, determining elevation, a', with respect to said fixed reference as the difference between said known altitude a of the radar platform and the determined height h of said platform with respect to a corresponding point on said terrain for each pixel.

7. A method as defined in claim 6 including the process of displaying said pixels with an indication of elevation.

8. A method as defined in claim 6 including the step of determining the horizontal distance, d, of each point on said terrain for each pixel from said vertical line and displaying each pixel at its distance from said vertical line.

9. A method as defined in claim 7 wherein said indication of elevation is displayed by quantizing elevation of pixels at predetermined constant intervals, and for pixels of equal quantized elevation, displaying intensity in a predetermined color distinct from all other colors used for other quantized elevations over at least a distinct band of quantized elevations.

10. A method as defined in claim 9 including the step of determining the horizontal distance, d, of each point on said terrain for each pixel from said vertical line and displaying each pixel at its distance from said interval.

* * * * *